United States Patent
Kawachi et al.

(10) Patent No.: US 10,741,172 B2
(45) Date of Patent: Aug. 11, 2020

(54) CONFERENCE SYSTEM, CONFERENCE SYSTEM CONTROL METHOD, AND PROGRAM

(71) Applicant: HONDA MOTOR CO., LTD., Tokyo (JP)

(72) Inventors: Takashi Kawachi, Wako (JP);
Kazuhiro Nakadai, Wako (JP);
Tomoyuki Sahata, Tokyo (JP); Syota Mori, Hayami-gun (JP); Yuki Uezono, Hayami-gun (JP); Kyosuke Hineno, Hayami-gun (JP); Kazuya Maura, Hayami-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 15/934,402

(22) Filed: Mar. 23, 2018

(65) Prior Publication Data
US 2018/0286389 A1   Oct. 4, 2018

(30) Foreign Application Priority Data
Mar. 31, 2017   (JP) .................. 2017-070681

(51) Int. Cl.
| | |
|---|---|
| *G10L 15/18* | (2013.01) |
| *H04L 29/06* | (2006.01) |
| *G10L 15/22* | (2006.01) |
| *G06F 40/35* | (2020.01) |
| *G06F 40/279* | (2020.01) |

(Continued)

(52) U.S. Cl.
CPC ............ *G10L 15/18* (2013.01); *G06F 40/279* (2020.01); *G06F 40/35* (2020.01); *G10L 15/22* (2013.01); *H04L 65/403* (2013.01); *G10L 15/26* (2013.01); *G10L 15/265* (2013.01); *G10L 25/48* (2013.01)

(58) Field of Classification Search
USPC ................ 704/246, 247, 251, 252, 270–271
See application file for complete search history.

(56) References Cited

U.S. PATENT DOCUMENTS

| | | | |
|---|---|---|---|
| 2009/0220064 A1* | 9/2009 | Gorti ................ | H04M 3/56 379/202.01 |
| 2013/0176910 A1* | 7/2013 | Gorti ................ | H04M 3/56 370/260 |

(Continued)

FOREIGN PATENT DOCUMENTS

| | | |
|---|---|---|
| JP | 08-194492 | 7/1996 |
| JP | 2001-127657 A | 5/2001 |

(Continued)

OTHER PUBLICATIONS

Japanese Office Action with English Translation dated Sep. 4, 2018, 8 pages.

(Continued)

*Primary Examiner* — Leonard Saint Cyr
(74) *Attorney, Agent, or Firm* — Rankin, Hill & Clark LLP

(57) ABSTRACT

A conference system includes an utterance indication processing unit configured to display text information representing utterance content of each speaker on a display unit of each of one or more terminals, and a notification unit configured to notify a speaker of a request to slow down a speech rate of the speaker.

7 Claims, 8 Drawing Sheets

(51) Int. Cl.
*G10L 15/26* (2006.01)
*G10L 25/48* (2013.01)

(56) References Cited

U.S. PATENT DOCUMENTS

| | | | |
|---|---|---|---|
| 2013/0244705 A1* | 9/2013 | Gould | H04M 3/42391 455/466 |
| 2014/0214403 A1 | 7/2014 | Kanevsky et al. | |
| 2015/0201084 A1* | 7/2015 | Gorti | H04M 3/56 370/260 |

FOREIGN PATENT DOCUMENTS

| | | |
|---|---|---|
| JP | 2002-101204 A | 4/2002 |
| JP | 2006-317768 A | 11/2006 |
| JP | 2008-256802 A | 10/2008 |
| JP | 2014-086014 A | 5/2014 |

OTHER PUBLICATIONS

Japanese Office Action dated Mar. 12, 2019 with English translation, 6 pages.

\* cited by examiner

CONFERENCE SYSTEM, CONFERENCE SYSTEM CONTROL METHOD, AND PROGRAM

CROSS-REFERENCE TO RELATED APPLICATION

Priority is claimed on Japanese Patent Application No. 2017-070681, filed Mar. 31, 2017, the content of which is incorporated herein by reference.

BACKGROUND OF THE INVENTION

Field of the Invention

The present invention relates to a conference system, a conference system control method, and a program.

Description of Related Art

A technology is known that performs voice recognition on the utterance content of each of speakers attending a conference, converts the utterance content of each speaker into text, and displays the text on a terminal (a smart phone, a tablet, a notebook PC, or the like) of each participant in the conference (for example, refer to Japanese Unexamined Patent Application, First Publication No. H8-194492).

SUMMARY OF THE INVENTION

However, since voice recognition takes time, when utterance content is displayed and read, a conference may already have moved to another topic. In addition, the speed at which voice recognition text is read may not be able to keep up with the speed at which utterance content is being added and displayed on a terminal in some cases.

Aspects of the present invention are made to solve the above problems, and an object of the present invention is to provide a conference system, a conference system control method, and a program which can support an utterance conforming to a speed at which utterance content of a conference is converted into text and a speed at which the utterance content converted into text is read.

In order to achieve the above objects, the present invention adopts the following aspects.

(1) A conference system according to one aspect of the present invention includes an utterance indication processing unit configured to display text information representing utterance content of each speaker on a display unit of each of one or more terminals, and a notification unit configured to notify a speaker of a request to slow down a speech rate of the speaker.

(2) In the aspect (1), the notification unit may notify the speaker of a request for a re-utterance or a detailed description of the utterance content.

(3) In the aspect (1) or (2), the notification unit may display the notification on the display unit.

(4) In the aspect (1), the conference system further includes a target speaker input unit configured to input target speaker information indicating that the speaker be requested to slow down a speech rate, in which the notification unit may display the request to slow down a speech rate and information of the speaker indicated by the target speaker information on the display unit.

(5) In the aspect (2), the conference system further includes a target utterance input unit configured to input target utterance information indicating that the utterance content be requested for the re-utterance or the detailed description, in which the notification unit may display a request to the speaker for the re-utterance or the detailed description and information indicating the utterance content indicated by the target utterance information on the display unit.

(6) In any one of the aspects (1) to (5), the notification unit may be constituted by a button or an icon image displayed on the display unit.

(7) In any one of the aspects (1) to (6), the conference system further includes an input unit configured to input a voice signal of the speaker or text information representing utterance content of the speaker, and a speech rate calculation unit configured to calculate a speech rate on the basis of the voice signal or the text information input by the input unit, in which the notification unit may notify a speaker of a request to slow down a speech rate on the basis of the speech rate calculated by the speech rate calculation unit.

(8) A method of controlling a conference system executed by a conference system includes an utterance content display process of displaying text information representing utterance content of each speaker on a display unit of each of one or more terminals, and a notification process of notifying a speaker of a request to slow down a speech rate of the speaker.

(9) A program which causes a computer of a conference support apparatus to execute processes which include an utterance content display process of displaying text information representing utterance content of each speaker on a display unit of each of one or more terminals connected to the conference support apparatus, and a notification process of notifying a speaker of a request to slow down a speech rate of the speaker.

(10) A program which causes a computer of a terminal connected to a conference support apparatus to execute processes which include an utterance content display process of receiving text information representing utterance content of each speaker from the conference support apparatus and displaying the received text information on a display unit, and a notification display process of receiving a notification of a request to slow down a speech rate of the speaker from the conference support apparatus and displaying the received notification on the display unit.

According to the aspect (1), (8), (9), or (10), when text of utterance content in a conference is displayed on a terminal used by each of participants in the conference, it is possible to request participants to speak slowly.

According to the aspect (2), it is possible to urge a speaker to speak again or give a detailed description of utterance content.

According to the aspect (3), a speaker can recognize that a request to speak slowly is made according to a terminal used for a display of the text of utterance content.

According to the aspect (4), a speaker can recognize which speaker is requested for a re-utterance or a detailed description according to a terminal used for a display of the text of utterance content.

According to the aspect (5), a speaker can recognize which utterance is requested for a re-utterance or a detailed description according to a terminal used for a display of the text of utterance content.

According to the aspect (6), it is possible to request a speaker to speak slowly or to request a speaker for a re-utterance or a detailed description by performing a simple operation.

According to the aspect (7), when a speech rate is fast, it is possible to notify a speaker to speak slowly without an operation of a user.

DETAILED DESCRIPTION OF THE INVENTION

Hereinafter, embodiments of the present invention will be described with reference to drawings.

First Embodiment

Figure 1:
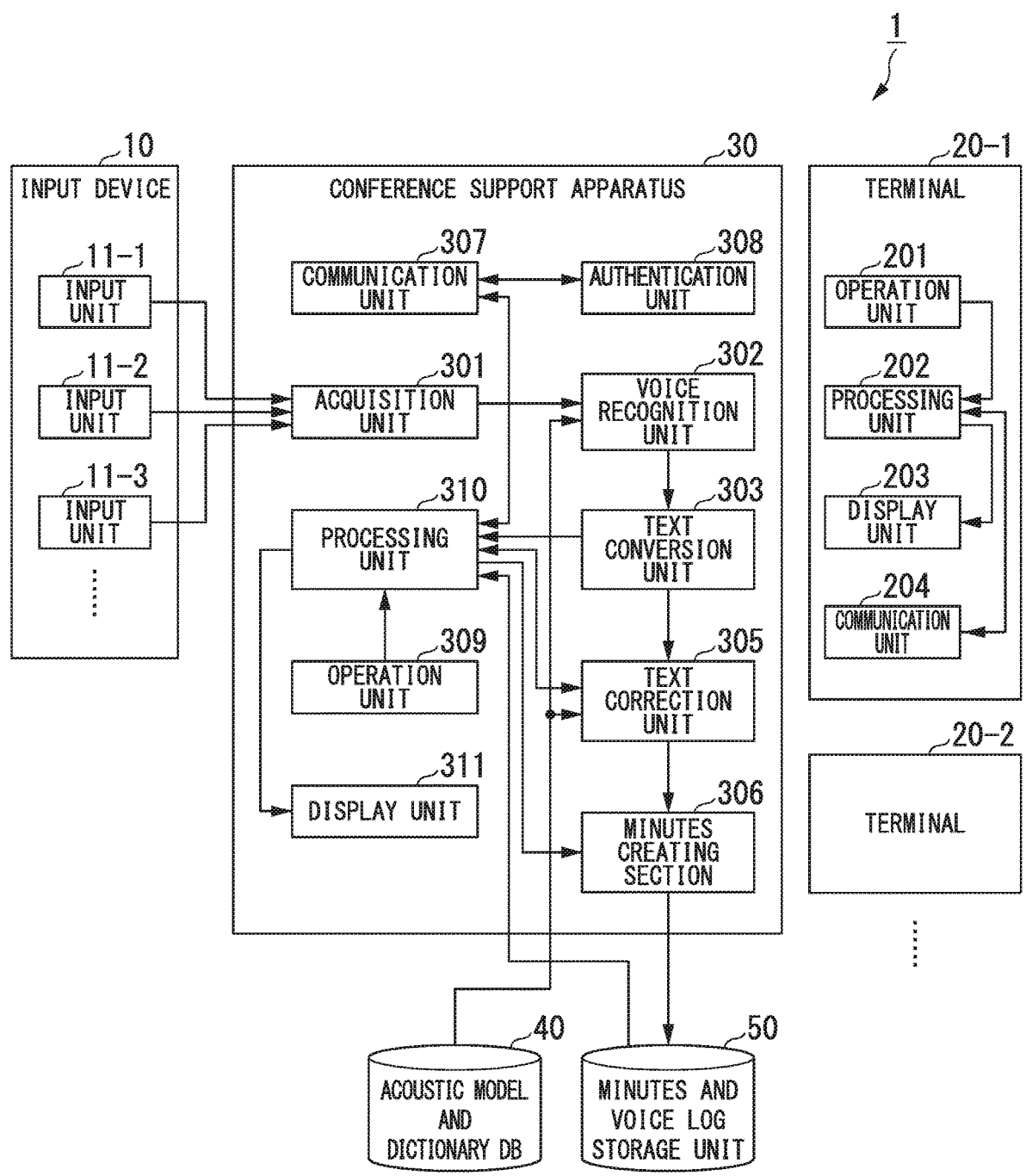
FIG. 1 is a block diagram showing a configuration example of a conference system according to a first embodiment.

FIG. 1 is a block diagram showing a configuration example of a conference system 1 according to the present embodiment.

First, a configuration of the conference system 1 will be described. The conference system 1 includes an input device 10, a terminal 20, a conference support apparatus 30, an acoustic model and dictionary DB 40, and a minutes and voice log storage unit 50. The conference system 1 includes one or more terminals 20. The conference system 1 shown in FIG. 1 includes a plurality of terminals 20, and each of these plurality of terminals 20 is described as a terminal 20-1, a terminal 20-2, . . . and so forth. The input device 10 and the conference support apparatus 30 are connected in a wired or wireless manner. The terminal 20 and the conference support apparatus 30 are connected in a wired or wireless manner. In the present embodiment, the input device 10 inputs the voice of a user.

The conference system 1 is used in a conference in which a plurality of persons participate. Each of the participants in a conference uses the input device 10 and the terminal 20. In the case of a conference in which healthy persons and hearing-impaired persons participate, hearing-impaired persons who speak with healthy persons use the input device 10 and the terminal 20 and hearing-impaired persons who do not speak use the terminal 20.

First, the input device 10 will be described.

The input device 10 outputs a voice signal representing a voice uttered by a user to the conference support apparatus 30. The input device 10 includes one or more input units 11. In FIG. 1, the input device 10 includes a plurality of input units 11, and each of these plurality of input units 11 is described as an input unit 11-1, an input unit 11-2, an input unit 11-3, . . . , and so forth.

The input unit 11 is a microphone. The microphone is attached to each user speaking at the conference. The input unit 11 collects voice signals of a user. The input unit 11 converts the collected voice signals from analog signals into digital signals, and outputs the voice signals converted into digital signals to the conference support apparatus 30. The input unit 11 may output analog voice signals to the conference support apparatus 30. The input unit 11 may output voice signals to the conference support apparatus 30 via wired cords or cables, and may also transmit voice signals to the conference support apparatus 30 wirelessly.

The input device 10 may be a microphone array. In this case, the input device 10 has P microphones disposed at different positions. Then, the input device 10 generates voice signals of P channels (P is an integer of two or more) from collected sounds, and outputs the generated voice signals of P channels to the conference support apparatus 30.

Next, the terminal 20 will be described.

The terminal 20 is a computer terminal such as a smart phone, a tablet terminal, a personal computer, or the like. The terminal 20 includes an operation unit 201, a processing unit 202, a display unit 203, and a communication unit 204.

The operation unit 201 detects an operation of a user and outputs a result of the detection to the processing unit 202. The operation unit 201 is, for example, a touch panel type sensor provided on the display unit 203 or a keyboard.

The processing unit 202 generates request information to be transmitted to the conference support apparatus 30 in accordance with a result of the operation detected by the operation unit 201, and outputs the generated request information to the communication unit 204. The request information is information that has set requested content and is, for example, speech rate reduction request notification information, re-utterance request notification information, detailed description request notification information, minutes read request information. The speech rate reduction request information is information for notifying that there has been a request to slow down a speech rate. The re-utterance request notification information is information for notifying that a re-utterance is requested. The detailed description request notification information is information for notifying that a detailed description of utterance content is requested. The speech rate reduction request information, the re-utterance request notification information, and the detailed description request notification information are collectively referred to as utterance-related request notification information. The minutes read request information is information for notifying that a read of minutes is requested. In addition, the processing unit 202 displays image data on the display unit 203 on the basis of information received from the conference support apparatus 30.

The display unit 203 displays the image data output from the processing unit 202. The display unit 203 is, for example, a liquid crystal display device, an organic electroluminescence (EL) display device, an electronic ink display device, or the like.

The communication unit 204 receives various types of information such as utterance information or minutes information, and utterance related request distribution information from the conference support apparatus 30, and outputs them to the processing unit 202. The utterance information is information including utterance content text which is text data representing utterance content of a user. The utterance information further includes information on a speaker (a user who has uttered), information on utterance time, and an utterance identifier which is information determining an utterance. The utterance time may also be the utterance identifier. The utterance related request distribution information is information distributed to output a notification indicating that there is a request related to an utterance to each terminal 20. The utterance related request distribution information includes speech rate reduction request distribution information, re-utterance request distribution information, and detailed description request distribution information. The speech rate reduction request distribution information is information distributed to output a request to speak slowly to each terminal 20. The re-utterance request distribution information is information distributed to output a request to repeat an utterance to each terminal 20. The detailed description request distribution information is information distributed to output a request for a detailed description to each terminal 20. In addition, the communication unit 204 transmits information output by the processing unit 202 to the conference support apparatus 30.

Next, the acoustic model and dictionary DB 40 will be described.

The acoustic model and dictionary DB 40 store an acoustic model, a language model, a word dictionary, and the like. The acoustic model is a model based on a feature amount of a sound, and the language model is a model of information of words and an arrangement thereof. In addition, the word dictionary is a dictionary with a large number of vocabularies, for example, a large vocabulary word dictionary.

Next, the minutes and voice log storage unit 50 will be described.

The minutes and voice log storage unit 50 stores information on minutes and a voice log which is data of voice signals to which utterance time is given.

Next, the conference support apparatus 30 will be described.

The conference support apparatus 30 is, for example, one of a personal computer, a server computer, a smart phone, a tablet terminal, and the like. The conference support apparatus 30 includes an acquisition unit 301, a voice recognition unit 302, text conversion unit 303, text correction unit 305, a minutes creating section 306, a communication unit 307, an authentication unit 308, an operation unit 309, a processing unit 310, and a display unit 311.

The acquisition unit 301 acquires voice signals output by the input unit 11, and outputs the acquired voice signals to the voice recognition unit 302. When the acquired voice signals are analog signals, the acquisition unit 301 converts the analog signals into digital signals, and outputs the voice signals converted into digital signals to the voice recognition unit 302.

The voice recognition unit 302 performs voice recognition for each speaker using the input unit 11 when there are a plurality of input units 11. The voice recognition unit 302 acquires the voice signals output by the acquisition unit 301. The voice recognition unit 302 detects voice signals of an utterance section from the voice signal output by the acquisition unit 301. The detection of an utterance section is performed by, for example, detecting a voice signal having a predetermined threshold value or more as an utterance section. The voice recognition unit 302 may also perform the detection of an utterance section using another well-known method. The voice recognition unit 302 refers to the acoustic model and dictionary DB 40 and performs voice recognition on voice signals of a detected utterance section using a well-known method. For example, the voice recognition unit 302 performs voice recognition using a method disclosed in Japanese Unexamined Patent Application, First Publication No. 2015-64554, or the like. The voice recognition unit 302 outputs a result of the recognition and recognized voice signals to the text conversion unit 303. The voice recognition unit 302 outputs a result of the recognition and voice signals in correspondence with, for example, each sentence, each utterance section, or each speaker.

The text conversion unit 303 converts a result of the recognition output by the voice recognition unit 302 into text data. The text conversion unit 303 outputs utterance content text which is text data to the text correction unit 305. The text conversion unit 303 outputs voice signals and utterance content text which indicates a result of recognizing the voice signals to the processing unit 310 if the processing unit 310 measures a speech rate.

The text correction unit 305 refers to the acoustic model and dictionary DB 40 in accordance with a correction instruction output by the processing unit 310 and corrects utterance content text output by the text conversion unit 303. The text correction unit 305 may delete interjections such as "ah", "uh", "wow", and "oh" and correct the utterance content text. In addition, the text correction unit 305 may delete words, sentences, or the like from a display and correct the utterance content text in accordance with a correction instruction output by the processing unit 310 on the basis of an operation or the like by the operation unit 309. The words or the sentences deleted from a display are, for example, chat or the like. The text correction unit 305 adds a user identifier of a speaker and utterance time to corrected utterance content text and outputs the utterance content text to the minutes creating section 306 and the processing unit 310. The user identifier is information for specifying each user, and an identifier of the terminal 20 may also be used. In addition, the text correction unit 305 may perform a morpheme analysis on utterance content indicated by the corrected utterance content text, and add a result of the morpheme analysis to the utterance content text.

The minutes creating section 306 creates minutes on the basis of utterance content text and voice signals output by the text correction unit 305. The minutes creating section 306 causes the minutes and voice log storage unit 50 to store the created minutes and corresponding voice signals. The minutes creating section 306 may create minutes by deleting the interjections such as "ah", "uh", "wow", and "oh". Minutes information includes user display information of a user which has performed an utterance, utterance content text which is a result of the correction by the text correction unit 305, and the like, and may further include information on utterance time. The user display information is, for example, text representing a name of a user, but an image representing a user can be used instead of or in addition to the text representing the name of a user. The user display information is stored in association with a user identifier in a storage unit (not shown) included in the conference support apparatus 30 or a storage device connected to the conference support apparatus 30 in advance.

The communication unit 307 transmits or receives information to or from the terminal 20. The information received from the terminal 20 includes a request for participation, voice signals, request information, and the like. The communication unit 307 extracts, for example, an identifier for identifying a terminal 20 from the request for participation received from a terminal 20, and outputs the extracted identifier to the authentication unit 308. The identifier is, for example, a serial number of the terminal 20, a Media Access Control (MAC) address, an Internet Protocol (IP) address, and the like. The communication unit 307 communicates with the terminal 20 which has requested for participation in a conference when the authentication unit 308 has output an instruction to allow communication participation. The communication unit 307 does not communicate with the terminal 20 which has requested for participation in a conference when the authentication unit 308 has output an instruction not to allow communication participation. The communication unit 307 extracts request information from the received information and outputs the extracted request information to the processing unit 310. The communication unit 307 transmits utterance information and utterance related request distribution information output by the processing unit 310 to the terminal 20 which has requested for participation. The communication unit 307 transmits minutes information output by the processing unit 310 to the terminal 20 of a transmission source of minutes read request information.

The authentication unit 308 receives an identifier output by the communication unit 307, and determines whether to permit communication. The conference support apparatus 30, for example, receives a registration of the terminal 20 used by a user participating in a conference and stores the registration in the authentication unit 308. The authentication unit 308 outputs an instruction to allow communication participation or an instruction not to allow communication participation to the communication unit 307 in accordance with a result of the determination.

The operation unit 309 is, for example, a keyboard, a mouse, a touch panel sensor provided on the display unit 311, or the like. The operation unit 309 detects an operation result of a user and outputs the detected operation result to the processing unit 310.

The processing unit 310 generates utterance information based on utterance content text output by the text correction unit 305, and outputs the generated utterance information to the communication unit 307. The processing unit 310 performs an operation in accordance with request information. When the request information is utterance related request notification information, the processing unit 310 generates utterance related request distribution information, and outputs the information to the communication unit 307. In addition, when the request information is minutes read request information, the processing unit 310 reads minutes from the minutes and voice log storage unit 50, and outputs information on read minutes to the communication unit 307.

The display unit 311 displays image data output by the processing unit 310. The display unit 311 is, for example, a liquid crystal display device, an organic EL display device, an electronic ink display device, or the like.

When the input device 10 is a microphone array, the conference support apparatus 30 further includes a sound source localization unit, a sound source separation unit, and a sound source identification unit. In this case, the sound source localization unit of the conference support apparatus 30 performs sound source localization on voice signals acquired by the acquisition unit 301 using a transfer function generated in advance. Then, the conference support apparatus 30 performs speaker identification using a result of the localization performed by the sound source localization unit. The conference support apparatus 30 performs sound source separation on the voice signals acquired by the acquisition unit 301 using a result of the localization performed by the sound source localization unit. Then, the voice recognition unit 302 of the conference support apparatus 30 performs detection of an utterance section and voice recognition on separated voice signals (for example, refer to Japanese Unexamined Patent Application, First Publication No. 2017-9657). In addition, the conference support apparatus 30 may also perform de-reverberation processing.

Figure 2:
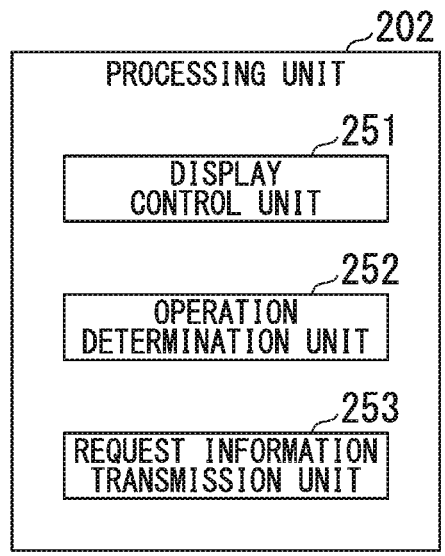
FIG. 2 is a block diagram showing a configuration example of a processing unit included in a terminal according to the embodiment.

FIG. 2 is a block diagram showing a specific configuration of the processing unit 202 included in the terminal 20. The processing unit 202 includes a display control unit 251, an operation determination unit 252, and a request information transmission unit 253.

The display control unit 251, when information received from the communication unit 204 is utterance information, displays image data for displaying the utterance content text and information of a speaker included in utterance information on the display unit 203. In addition, the display control unit 251, when the information received from the communication unit 204 is utterance related request distribution information, generates image data for displaying a request related to an utterance on the basis of the utterance related request distribution information, and displays the image data on the display unit 203. The request related to an utterance is a request to slow down a speech rate, a request for a re-utterance, or a request for a detailed description of utterance content. In addition, the display control unit 251, when the information received form the communication unit 204 is information on minutes, generates image data for displaying minutes and displays the image data on the display unit 203.

The operation determination unit 252, when it is determined that an operation by the operation unit 201 is an operation of instructing transmission of request information, outputs the content of an operation by the operation unit 201 to the request information transmission unit 253.

The request information transmission unit 253 generates request information in accordance with an operation by the operation unit 201, outputs the request information to the communication unit 204. The request information transmission unit 253 generates utterance related request notification information addressed to the conference support apparatus 30, and outputs it to the communication unit 204 when an operation of inputting the request related to an utterance is performed. The request information transmission unit 253 generates minutes read request information addressed to the conference support apparatus 30 and outputs it to the communication unit 204 when an operation of requesting for minutes is performed. The communication unit 204 transmits utterance related request notification information or minutes read request information to the conference support apparatus 30.

Figure 3:
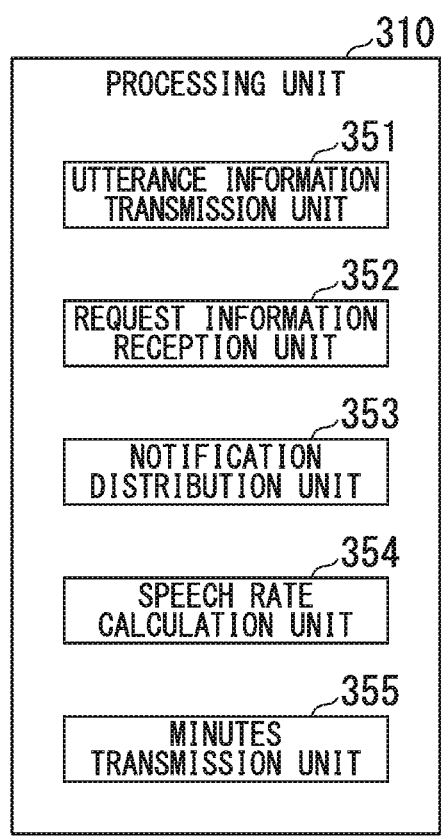
FIG. 3 is a block diagram showing a configuration example of a processing unit included in a conference support apparatus according to the embodiment.

FIG. 3 is a block diagram showing a detailed configuration of the processing unit 310 included in the conference support apparatus 30. The processing unit 310 includes an utterance information transmission unit 351, a request information reception unit 352, a notification distribution unit 353, a speech rate calculation unit 354, and a minutes transmission unit 355.

The utterance information transmission unit 351 generates utterance information on the basis of utterance content text output by the text correction unit 305. For example, the utterance information transmission unit 351 generates utterance information by adding user display information determined by a user identifier of a speaker and an utterance identifier to utterance content text to which a user identifier of a speaker and utterance time are added. When the utterance time is used as an utterance identifier, an utterance identifier may not be allocated in the utterance information transmission unit 351. The utterance information transmission unit 351 outputs utterance information addressed to the terminal 20 which requests for participation to the communication unit 307.

The request information reception unit 352 receives request information transmitted by the terminal 20 from the communication unit 307, and analyzes the request information.

The notification distribution unit 353 generates utterance related request distribution information when it is determined by the request information reception unit 352 that the request information is utterance related request notification information. The notification distribution unit 353 outputs utterance related request distribution information addressed to the terminal 20 which requests for participation to the communication unit 307.

The speech rate calculation unit 354 calculates a speech rate on the basis of the number of characters obtained from a result of converting voice signals for a certain period of time into text by the text conversion unit 303. The speech rate calculation unit 354 determines whether a speech rate is fast by comparing the calculated speech rate with a threshold value.

The minutes transmission unit 355 outputs information on minutes read from the minutes and voice log storage unit 50 to the communication unit 307 by setting the terminal 20 which is a transmission source of the minutes read request information as a destination.

Next, a processing procedure example of the conference system 1 will be described. In the following, an example in which a plurality of users A, B, C, D, and so forth participate in a conference will be described. Each of the plurality of users A, B, C, D, . . . , and so forth uses the terminal 20, and some of these participants use the input unit 11. It is described that a user A uses the input unit 11-1 and the terminal 20-1, a user B uses the input unit 11-2 and the terminal 20-2, a user D uses the terminal 20-3, and does not use the input unit 11. A user C and other participants use the input units 11 other than the input units 11-1 and 11-2, and the terminals 20 other than the terminals 20-1 to 20-3.

Figure 4:
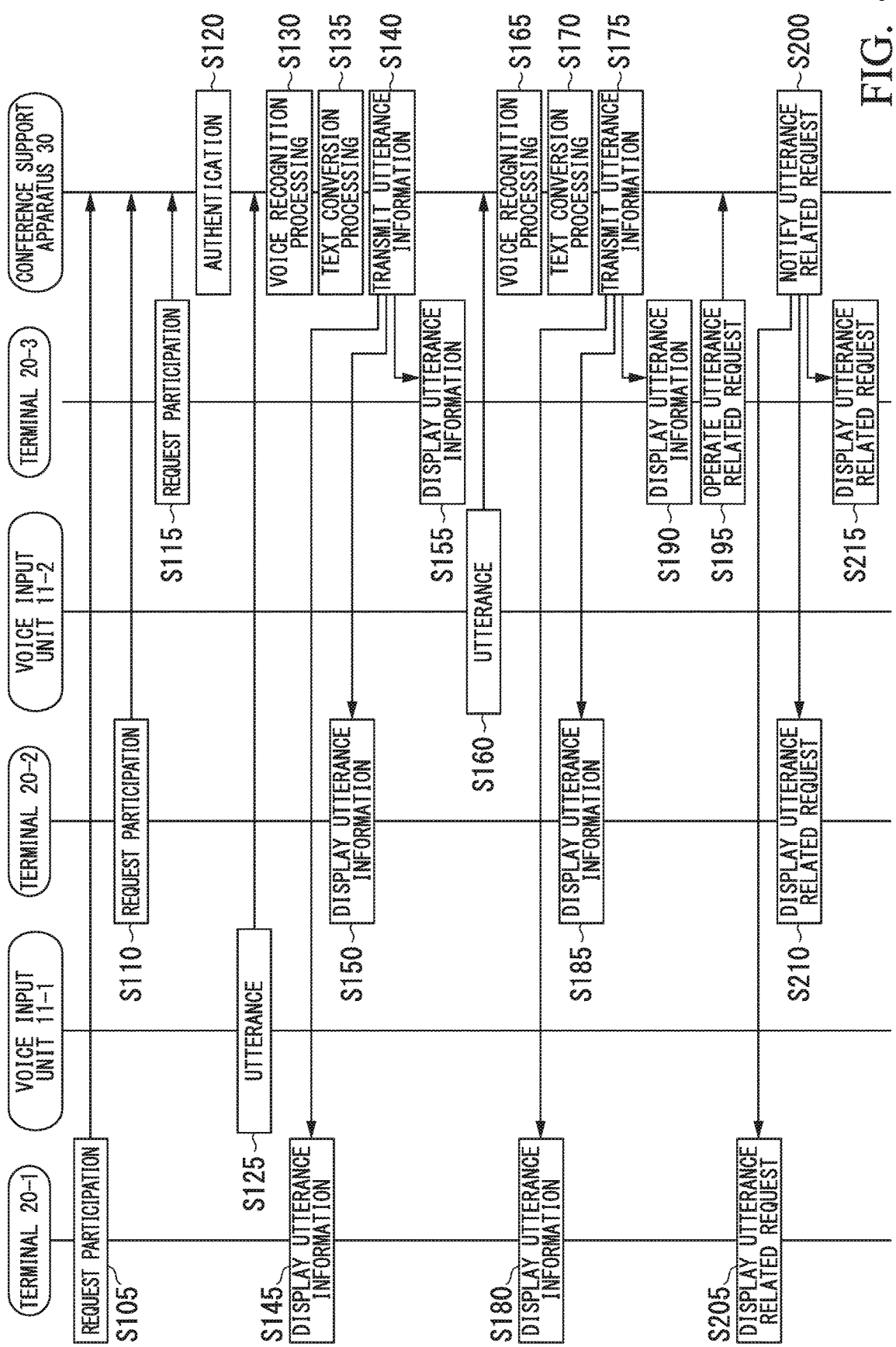
FIG. 4 is a sequence diagram showing a processing procedure example of a conference system according to the embodiment.

FIG. 4 is a sequence diagram showing a processing procedure example of the conference system 1 according to the present embodiment. FIG. 4 shows only a sequence related to the input units 11-1 and 11-2 and the terminals 20-1 to 20-3, but the same applies to the input units 11 and the terminals 20 used by the user C and other participants.

(Step S105 to S115) The user A operates the operation unit 201 of the terminal 20-1, the user B operates the operation unit 201 of the terminal 20-2, and the user D operates the operation unit 201 of the terminal 20-3 to participate in a conference. In each of the terminals 20-1 to 20-3, the operation determination unit 252 determines that an operation to request for participation in the conference is performed, and the request information transmission unit 253 transmits a request for participation to the conference support apparatus 30.

(Step S120) The communication unit 307 of the conference support apparatus 30 receives a request for participation transmitted by each of the terminals 20-1 to 20-3. Subsequently, the communication unit 307 extracts, for example, an identifier for identifying the terminal 20 from the request for participation received from the terminal 20. The authentication unit 308 of the conference support apparatus 30 receives an identifier output by the communication unit 307 and authenticates whether to allow communication. The example of FIG. 4 is an example in which participation of the terminals 20-1 to 20-3 has been allowed.

(Step S125) The user A performs an utterance. The input unit 11-1 outputs voice signals to the conference support apparatus 30.

(Step S130) The voice recognition unit 302 of the conference support apparatus 30 performs voice recognition processing on voice signals received from the input unit 11-1.

(Step S135) The text conversion unit 303 of the conference support apparatus 30 converts the voice signals into text data.

(Step S140) The text correction unit 305 of the conference support apparatus 30 performs correction on utterance content text which is text data converted by the text conversion unit 303, and outputs the utterance content text to the processing unit 310 by adding a user identifier of the user A who performs an utterance and utterance time thereto. The utterance information transmission unit 351 of the conference support apparatus 30 generates utterance information by adding user display information of the user A and the utterance identifier to the utterance content text output by the text correction unit 305. The utterance information transmission unit 351 transmits the utterance information to the terminals 20-1 to 20-3 via the communication unit 307.

(Step S145 to S155) In each of the terminals 20-1 to 20-3, the communication unit 204 outputs the utterance information transmitted by the conference support apparatus 30 to the processing unit 202. In each of the terminals 20-1 to 20-3, the display control unit 251 of the processing unit 202 displays the received utterance information on the display unit 203.

(Step S160) The user B performs an utterance. The input unit 11-2 transmits voice signals to the conference support apparatus 30.

(Step S165) The voice recognition unit 302 of the conference support apparatus 30 performs voice recognition processing on voice signals received from the input unit 11-2.

(Step S170) The text conversion unit 303 of the conference support apparatus 30 converts the voice signals into text.

(Step S175) The text correction unit 305 of the conference support apparatus 30 performs correction on utterance content text which is text data converted by the text conversion unit 303, and outputs the utterance content text to the processing unit 310 by adding a user identifier of the user B who performs an utterance and utterance time thereto. The utterance information transmission unit 351 of the conference support apparatus 30 generates utterance information by adding user display information of the user B and the utterance identifier to the utterance content text output by the text correction unit 305. The utterance information transmission unit 351 transmits the utterance information to the terminals 20-1 to 20-3 via the communication unit 307.

(Step S180 to step S190) Each of the terminals 20-1 to 20-3 performs the same processing as step S145 to step S155.

(Step S195) The user D operates the operation unit 201 of the terminal 20-3 and inputs requests related to an utterance such as to speak slowly, to repeat an utterance again, and to describe in detail. In the processing unit 202 of the terminal 20-3, the operation determination unit 252 determines that an input operation of the requests related to an utterance has been performed, and the request information transmission unit 253 transmits utterance related request notification information in accordance with an operation of a user to the conference support apparatus 30.

(Step S200) The processing unit 310 of the conference support apparatus 30 generates utterance related request distribution information for distributing requests related to an utterance notified by the utterance related request notification information transmitted by the terminal 20-3. Subsequently, the processing unit 310 of the conference support apparatus 30 transmits the generated utterance related request distribution information to each of the terminals 20-1 to 20-3 via the communication unit 307.

(Step S205 to step S215) The communication unit 204 in each of the terminals 20-1 to 20-3 outputs utterance related request distribution information received from the conference support apparatus 30 to the processing unit 202. In each of the terminals 20-1 to 20-3, the display control unit 251 displays a request related to an utterance on the display unit 203 on the basis of the utterance related request distribution information.

Figure 5:
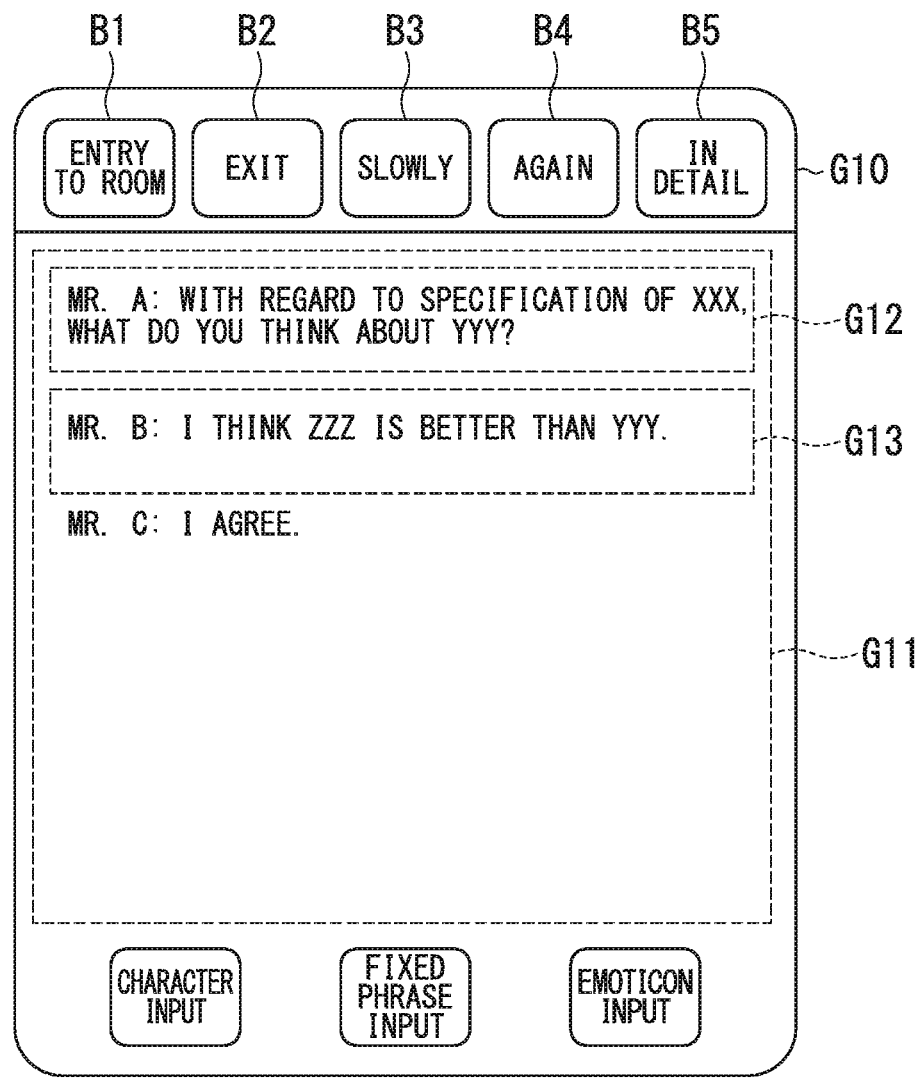
FIG. 5 is a diagram showing an example of a screen displayed on a display unit of a terminal according to the embodiment.

FIG. 5 is a diagram showing an example of a screen displayed on the display units 203 of the terminals 20-1 to 20-3.

FIG. 5 shows an example of a screen G10 displayed as a result of the user C speaking after the conference system 1 performs processing to step S190 shown in FIG. 4 and the conference system 1 further performing the same processing as step S130 to step S155.

The screen G10 includes a display of an entry button B1, an exit button B2, a slow button B3, an again button B4, and a details button B5 of icon images, and an utterance indication area G11. Furthermore, the screen G10 includes buttons of icon images for inputting arbitrary characters, fixed phrases, and emoticons.

The entry button B1 is a button for requesting the conference support apparatus 30 to participate in a conference. If the entry button B1 is touched, the terminal 20 transmits a request for participation to the conference support apparatus 30. The exit button B2 is a button for notifying the conference support apparatus 30 of an exit from a conference. The slow button B3, the again button B4, and the details button B5 are buttons for inputting requests related to an utterance. The slow button B3 is a button for requesting to speak slowly. The again button B4 is a button for requesting to repeat an utterance. The details button B5 is a button for requesting to speak in detail for uttered content. If the slow button B3, the again button B4, or the details button B5 is touched, the terminal 20 transmits utterance related request notification information to the conference support apparatus 30.

User display information of a speaker and text representing utterance content of the speaker are displayed in a chronological order in the utterance indication area G11. In FIG. 5, the user display information is text of a name of a user such as "Mr. A" or "Mr. B". User display information indicating Mr. A and utterance content of Mr. A are displayed in an area G12, and user display information indicating Mr. B and utterance content of Mr. B are displayed in an area G13 of the utterance indication area G11.

In the above description, the slow button B3, the again button B4, and the details button B5 of icon images are displayed on the display unit 203 of the terminal 20, but physical buttons corresponding to each of these buttons may also be provided in a housing of the terminal 20 or separately from the terminal 20.

Subsequently, processing of conference system 1 in steps S195 to S215 of FIG. 4 when a request related to an utterance is performed will be described.

First, processing of the conference system 1 when the user D has touched the slow button B3 in the terminal 20-3 will be described.

Figure 6:
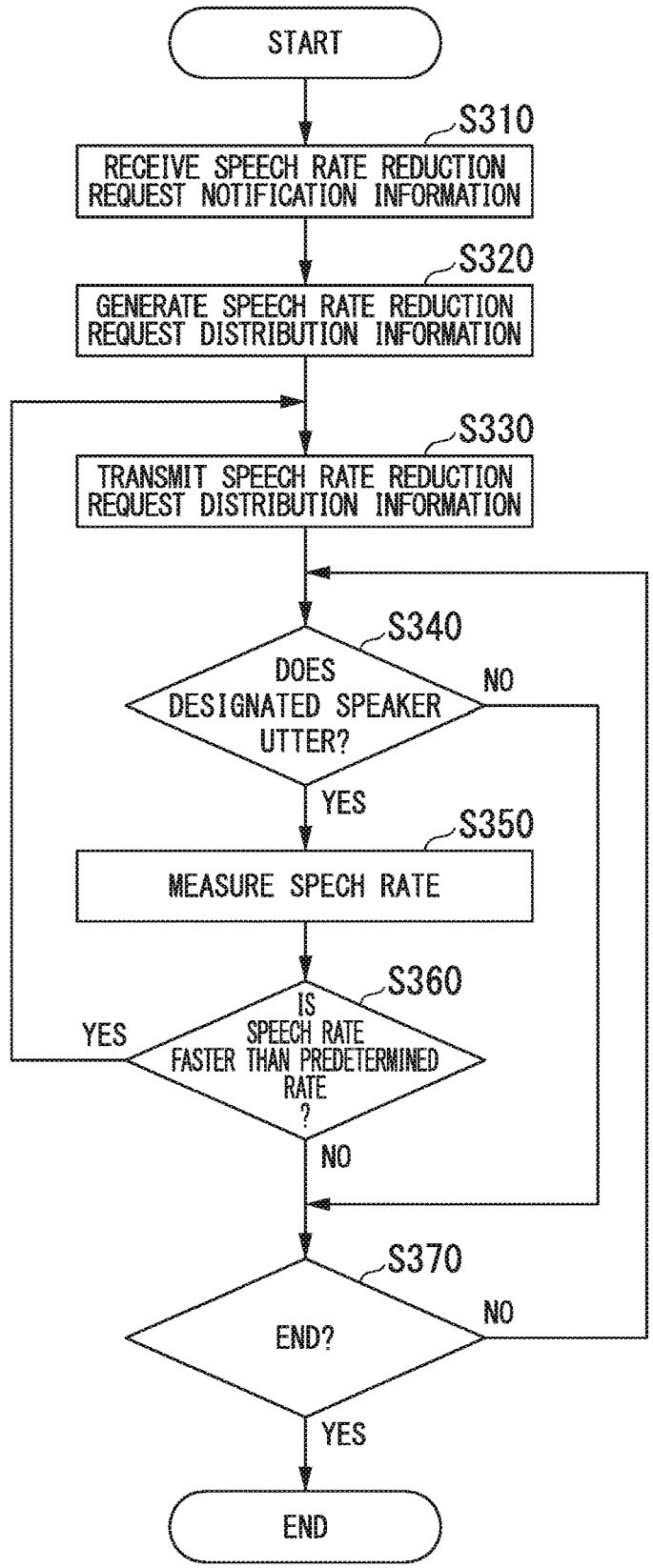
FIG. 6 is a flow diagram showing a processing procedure example of the conference support apparatus according to the embodiment.

FIG. 6 is a flow diagram showing a processing procedure example of the conference support apparatus 30 when the slow button B3 is touched in the terminal 20. If the user D wants Mr. A to speak slowly, the user D touches the area G12 in which the utterance of Mr. A is displayed on the screen G10 (FIG. 5) displayed by the terminal 20-3. At this time, the display control unit 251 of the terminal 20-3 may display that the area G12 is selected by changing a character color of the area G12, changing a background color, or the like. The user D further touches the slow button B3. The user D may touch the area G12 after touching the slow button B3.

The operation determination unit 252 of the terminal 20-3 detects that the area G12 is selected and the slow button B3 is operated. The request information transmission unit 253 of the terminal 20-3 acquires an utterance identifier and a user identifier from utterance information including utterance content designated by the user D, and transmits speech rate reduction request information in which the acquired utterance identifier and user identifier (target speaker information) have been set to the conference support apparatus 30.

(Step S310) The communication unit 307 of the conference support apparatus 30 receives speech rate reduction request information from the terminal 20, and outputs the received speech rate reduction request information to the processing unit 310. If it is determined that the speech rate reduction request information has been received, the request information reception unit 352 outputs the received speech rate reduction request information to the notification distribution unit 353. Furthermore, the request information reception unit 352 outputs a speech rate measurement request in which the user identifier acquired from the speech rate reduction request information has been set to the speech rate calculation unit 354. When the terminal 20 does not set a user identifier in the speech rate reduction request information, the request information reception unit 352 acquires a user identifier from utterance information determined by the utterance identifier set in the speech rate reduction request information, and adds the user identifier to the speech rate reduction request information.

(Step S320) The notification distribution unit 353 extracts an identifier of the terminal 20-3 of a transmission source set in the speech rate reduction request information, and acquires user display information "Mr. D" of the user D determined by the extracted identifier as requesting user display information. The notification distribution unit 353 acquires user display information determined by the utterance identifier set in the speech rate reduction request information as target speaker display information. The notification distribution unit 353 generates text data by, for example, adding a fixed phrase ", please speak slowly" corresponding to the speech rate reduction request information to target speaker display information "Mr. A". The generated text data is set to a notification text. The notification distribution unit 353 generates speech rate reduction request distribution information in which the requesting user display information, the generated notification text, and the utterance identifier acquired from the speech rate reduction request information are set.

(Step S330) The notification distribution unit 353 outputs speech rate reduction request distribution information in which each of the terminals 20 of respective users participating in a conference is set as a destination to the communication unit 307. The communication unit 307 transmits the speech rate reduction request distribution information to the terminals 20 of respective users. The display control unit 251 of each terminal 20 which has received the speech rate reduction request distribution information displays the requesting user display information and the notification text set in the speech rate reduction request distribution information on the display unit 203.

(Step S340) When any of the users has uttered, the processing unit 310 of the conference support apparatus 30 performs operations of steps S130 to S140 of FIG. 4. The speech rate calculation unit 354 of the conference support apparatus 30 determines whether it is an utterance of the user A designated by the user D according to whether a user identifier set in utterance content text output from the text conversion unit 303 coincides with the user identifier set in the speech rate measurement request. When the speech rate calculation unit 354 has determined that it is not the utterance of the user A, the processing of step S370 is performed and, when the speech rate calculation unit 354 has determined that it is the utterance of the user A, processing of step S350 is performed.

(Step S350) The speech rate calculation unit 354 of the conference support apparatus 30 calculates a speech rate which is the number of characters of text corresponding to voice data per unit time on the basis of voice data and utterance content text of the user A output from the text conversion unit 303.

(Step S360) The speech rate calculation unit 354 of the conference support apparatus 30 determines whether a speech rate of the user A is faster than a predetermined threshold value. When the speech rate calculation unit 354 has determined that the speech rate of the user A is faster than the threshold value, the processing unit 310 returns to step S330 and performs the processing. On the other hand, when the speech rate calculation unit 354 has determined that the speech rate of the user A is equal to or slower than the predetermined threshold value, the processing unit 310 performs processing of step S370.

(Step S370) The speech rate calculation unit 354 of the conference support apparatus 30 determines whether to end a speech rate measurement for the user A of a user identifier notified from the request information reception unit 352. Conditions for ending a speech rate measurement can be arbitrarily set. When the speech rate calculation unit 354 has determined not to end a speech rate measurement, processing from step S340 is performed and, when having determined to end a speech rate measurement, the processing of FIG. 6 ends.

Figure 7:
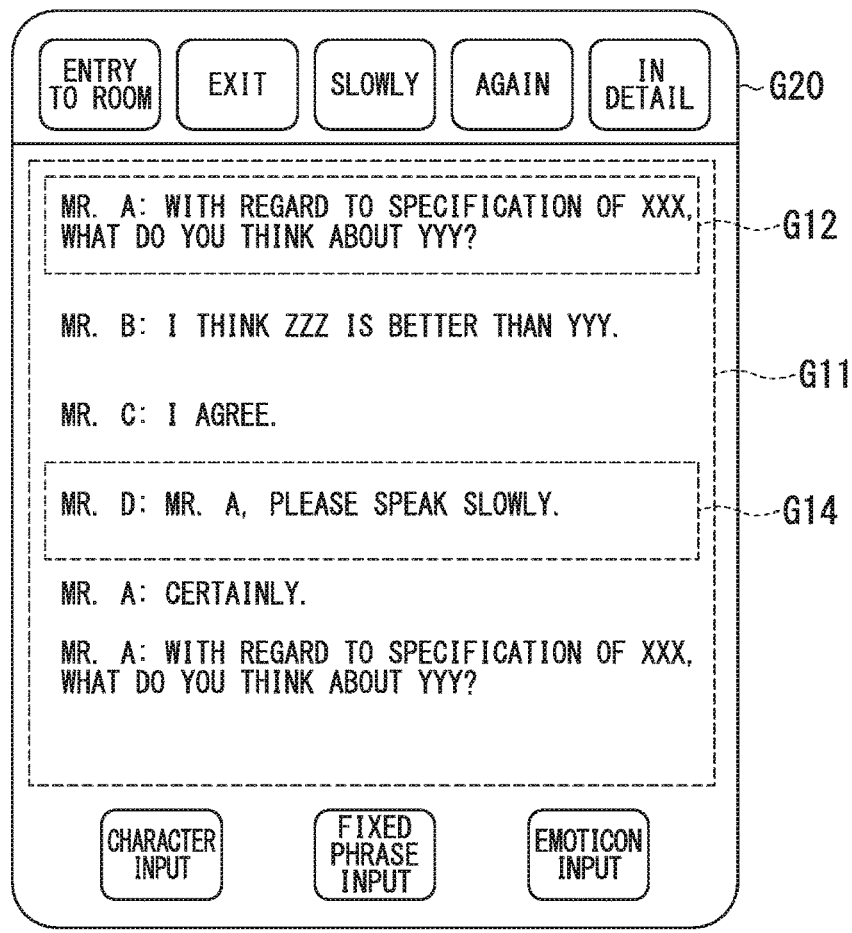
FIG. 7 is a diagram showing an example of a screen displayed on the display unit of a terminal according to the embodiment.

FIG. 7 is a diagram showing an example of a screen displayed on the display units 203 of the terminals 20-1 to 20-3 after the slow button B3 is operated on the screen G10 shown in FIG. 5. On a screen G20 shown in FIG. 7, requesting user display information and notification text included in the speech rate reduction request distribution information transmitted in step S330 described above are displayed in an area G14 in the utterance indication area G11. Utterance information based on an utterance of a user after a display of the area G14 is also displayed in the utterance indication area G11 shown in FIG. 7.

In the above description, a user designates a target speaker who is requested to speak slowly, but a speaker may not be designated. In this case, an utterance identifier and a user identifier are not set in speech rate reduction request information. The processing unit 310 of the conference support apparatus 30 operates assuming that all users are designated speakers when speech rate reduction request information with neither an utterance identifier nor a user identifier set is received from the terminal 20. In this case, the notification distribution unit 353 may use text (for example, "everyone") representing all members as target speaker display information, and may set a notification text "please, speak slowly" without having a designated target speaker to speech rate reduction request distribution information. In addition, a user may directly input a target user to be requested to speak slowly using the operation unit 201 of the terminal 20, or may select a target user from a list of users displayed on the display unit 203.

In addition, in the above description, the conference support apparatus 30 measures the speech rate of only a designated speaker after the speech rate reduction request information is received, but may also measure the speech rates of all users.

Moreover, the operation performed on the terminal 20 by a user is assumed as a trigger for the speech rate reduction request information in the above description, but a detection of a speech rate exceeding a threshold value in the conference support apparatus 30 may be assumed as a trigger. In this case, the speech rate calculation unit 354 of the conference support apparatus 30 calculates the speech rates of respective users, and outputs the speech rate reduction request information to the request information reception unit 352 when a user whose speech rate exceeds a predetermined speech rate is detected. An utterance identifier and a user identifier of utterance information having a set utterance content at the time of exceeding the predetermined speech rate are set in the speech rate reduction request information. The notification distribution unit 353 may not set requesting user display information or may set requesting user display information representing a system in the speech rate reduction request distribution information.

Next, processing of the conference system 1 when the user D has touched the again button B4 in the terminal 20-3 will be described.

Figure 8:
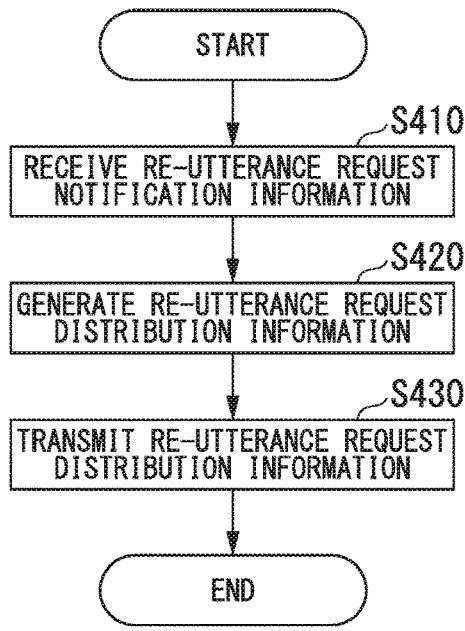
FIG. 8 is a flow diagram showing a processing procedure example of the conference support apparatus according to the embodiment.

FIG. 8 is a flow diagram showing a processing procedure example of the conference support apparatus 30 when the again button B4 is touched in the terminal 20. The user D touches the area G13 in which an utterance to be repeated once more is displayed on the screen G10 (FIG. 5) displayed by the terminal 20-3. At this time, the display control unit 251 of the terminal 20-3 may display that the area G13 is selected by changing a character color of the area G13, changing a background color, or the like. The user D further touches the again button B4. The user D may touch the area G13 after touching the again button B4.

The operation determination unit 252 of the terminal 20-3 detects that the area G13 is selected and the again button B4 is operated. The request information transmission unit 253 of the terminal 20-3 acquires an utterance identifier and a user identifier from utterance information including utterance content designated by the user D, and transmits re-utterance request notification information in which the acquired utterance identifier (target utterance information) and user identifier are set to the conference support apparatus 30.

(Step S410) The communication unit 307 of the conference support apparatus 30 receives re-utterance request notification information from the terminal 20, and outputs the received re-utterance request notification information to the processing unit 310. The request information reception unit 352 outputs the re-utterance request notification information to the notification distribution unit 353 if it is determined that the re-utterance request notification information has been received. When the terminal 20 does not set a user identifier in the re-utterance request notification information, the request information reception unit 352 acquires a user identifier from utterance information determined by the utterance identifier set in the re-utterance request notification information, and adds the user identifier to the re-utterance request notification information.

(Step S420) The notification distribution unit 353 extracts an identifier of the terminal 20-3 of a transmission source set in the re-utterance request notification information, and acquires user display information "Mr. D" of the user D determined by the extracted identifier as requesting user display information. The notification distribution unit 353 acquires user display information determined by the utterance identifier set in the re-utterance request notification information as target speaker display information. The notification distribution unit 353 generates a notification text by adding, for example, a fixed phrase ", please speak again" corresponding to re-utterance request notification information to target speaker display information "Mr. B". The notification distribution unit 353 generates re-utterance request distribution information in which requesting user display information, a generated notification text, and an utterance identifier acquired from the re-utterance request notification information are set.

(Step S430) The notification distribution unit 353 outputs re-utterance request distribution information in which each of the terminals 20 of respective users participating in a conference to the communication unit 307. The communication unit 307 transmits re-utterance request distribution information to the terminals 20 of respective users. The display control units 251 of the terminals 20 which have received the re-utterance request distribution information display requesting user display information and a notification text set in the re-utterance request distribution information on the display unit 203.

Figure 9:
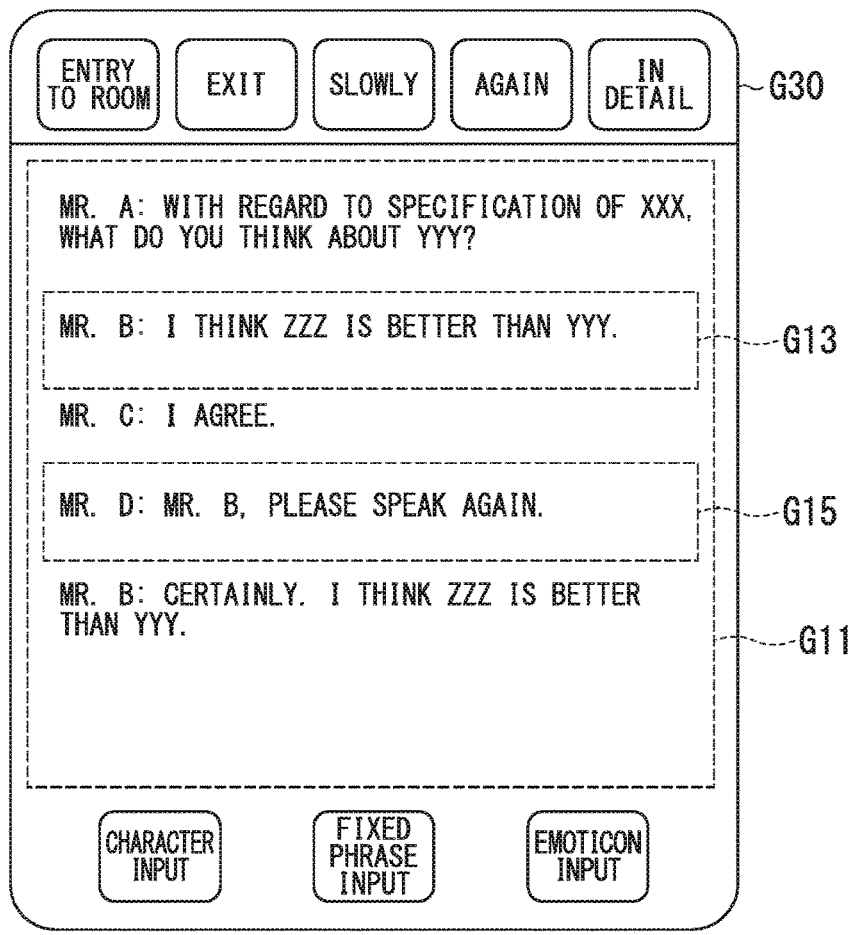
FIG. 9 is a diagram showing an example of a screen displayed on the display unit of a terminal according to the embodiment.

FIG. 9 is a diagram showing an example of a screen displayed on the display units 203 of the terminals 20-1 to 20-3 after the again button B4 is operated on the screen G10 shown in FIG. 5. On a screen G30 shown in FIG. 9, the requesting user display information and the notification text included in the re-utterance request distribution information transmitted in step S430 described above are displayed in an area G15 in the utterance indication area G11. Utterance information based on an utterance of a user after the area G15 is displayed is also displayed in the utterance indication area G11 shown in FIG. 9.

An operation performed on the terminal 20 by a user is assumed as a trigger for re-utterance request notification information in the above description, but a detection of a speech rate exceeding a threshold value in the conference support apparatus 30 may also be assumed as a trigger. In this case, the speech rate calculation unit 354 of the conference support apparatus 30 calculates the speech rates of respective users, and outputs re-utterance request notification information to the request information reception unit 352 when a user whose speech rate exceeds a predetermined speech rate is detected. An utterance identifier and a user identifier of utterance information with set utterance content at the time of exceeding a predetermined speech rate are set in the re-utterance request notification information. The notification distribution unit 353 may not set requesting user display information or may set requesting user display information representing a system in the re-utterance request distribution information.

Next, processing of the conference system 1 when the user D has touched the details button B5 in the terminal 20-3 will be described.

Figure 10:
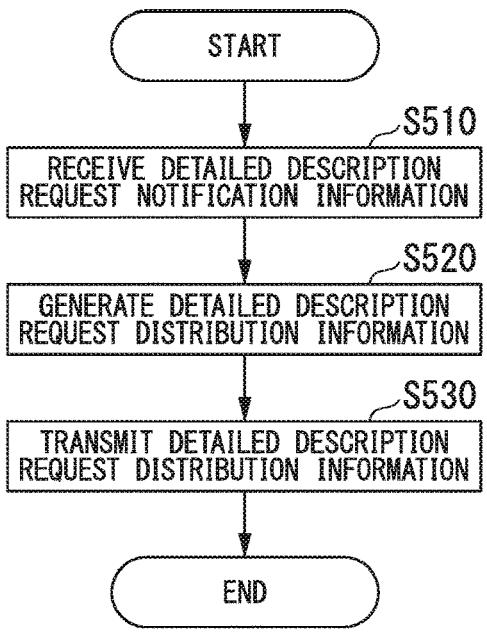
FIG. 10 is a flow diagram showing a processing procedure example of the conference support apparatus according to the embodiment.

FIG. 10 is a flow diagram showing a processing procedure example of the conference support apparatus 30 when the details button B5 is touched in the terminal 20. The user D touches the area G13 in which the utterance to be described in detail is displayed on the screen G10 (FIG. 5) displayed by the terminal 20-3. At this time, the display control unit 251 of the terminal 20-3 may display that the area G13 is selected by changing a character color of the area G13 or changing a background color. The user D further touches the details button B5. The user D may touch the area G13 in which the utterance is displayed after touching the details button B5.

The operation determination unit 252 of the terminal 20-3 detects that the area G13 is selected and the details button B5 is operated. The request information transmission unit 253 of the terminal 20-3 acquires an utterance identifier and a user identifier from utterance information including utterance content designated by the user D, and transmits detailed description request notification information in which the acquired utterance identifier (target utterance information) and user identifier are set to the conference support apparatus 30.

(Step S510) The communication unit 307 of the conference support apparatus 30 receives the detailed description request notification information from the terminal 20, and outputs the received detailed description request notification information to the processing unit 310. If it is determined that the detailed description request notification information has been received, the request information reception unit 352 outputs the detailed description request notification information to the notification distribution unit 353. When the terminal 20 does not set a user identifier in the detailed description request notification information, the request information reception unit 352 acquires a user identifier from utterance information determined by the utterance identifier set in the detailed description request notification information, and adds the user identifier to the detailed description request notification information.

(Step S520) The notification distribution unit 353 extracts an identifier of the terminal 20-3 of a transmission source set in the detailed description request notification information, and acquires user display information "Mr. D" of the user D determined by the extracted identifier as requesting user display information. The notification distribution unit 353 acquires user display information determined by the utterance identifier set in the detailed description request notification information as target speaker display information. The notification distribution unit 353 generates a notification text by, for example, adding a fixed phrase ", please speak in detail" corresponding to the detailed description request notification information to target speaker display information "Mr. B". The notification distribution unit 353 generates detailed description request distribution information in which requesting user display information, a generated notification text, and an utterance identifier acquired from the detailed description request notification information are set.

(Step S530) The notification distribution unit 353 outputs detailed description request distribution information in which each of the terminals 20 of respective users participating in a conference is set as a destination to the communication unit 307. The communication unit 307 transmits the detailed description request distribution information to the terminals 20 of respective users. The display control units 251 of the terminals 20 which have received the detailed description request notification information display the requesting user display information and the notification text set in the detailed description request distribution information on the display unit 203.

Figure 11:
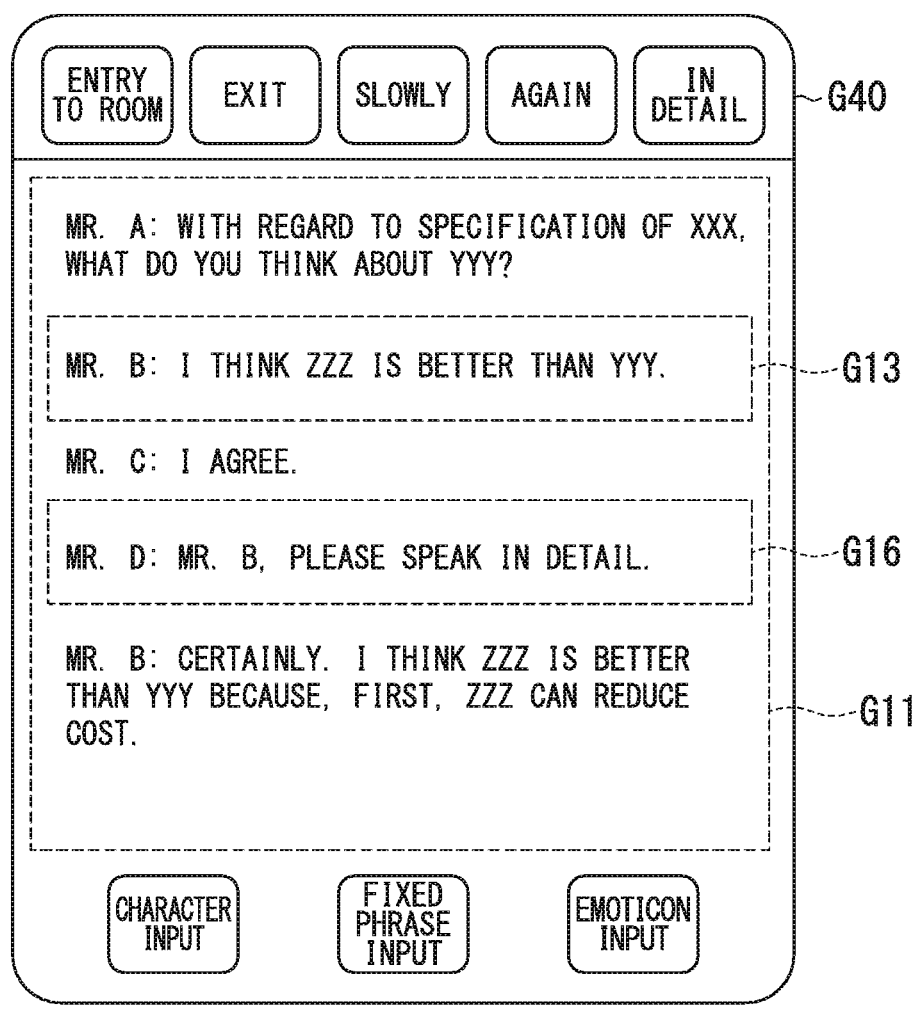
FIG. 11 is a diagram showing an example of a screen displayed on the display unit of a terminal according to the embodiment.

FIG. 11 is a diagram showing an example of a screen displayed on the display units 203 of the terminals 20-1 to 20-3 after the details button B5 is operated on the screen G10 shown in FIG. 5. On a screen G40 shown in FIG. 11, the requesting user display information and the notification text included in the detailed description request distribution information transmitted in step S530 described above are displayed in an area G16 in the utterance indication area G11. Utterance information based on an utterance of a user after the area G16 is displayed is also displayed in the utterance indication area G11 shown in FIG. 11.

The display control unit 251 of the terminal 20 may change a state of the display of utterance information determined by the utterance identifier set in the speech rate reduction request distribution information, the re-utterance request distribution information, or the detailed description request distribution information in FIGS. 7, 9, and 11. For example, the display control unit 251 of the terminal 20 may perform a display such as changing a character color of the area G12 or the area G13 displayed based on utterance information determined by the utterance identifier, changing a background color, or flickering a character.

In addition, the display control unit 251 of the terminal 20 may display a character color, a font size, a background color, and the like in the area G14, the area G15, and the area G16 differently from a display of the utterance content in the utterance indication area G11. In addition, when text is additionally displayed in the area G14, the area G15, or the area G16, the display control unit 251 of the terminal 20 may change and display a background color of the additionally displayed area G14, area G15, or area G16 or the entire utterance indication area G11 for a certain period of time. In addition, a display content in the area G14, the area G15, or the area G16 may be displayed like a pop-up message at an arbitrary position in the utterance indication area G11, in the vicinity of the area G12 or the area G13 selected by the user D, or the like, and, in this case, the display may be erased after a certain period of time.

Moreover, the user D designates an object requested for a re-utterance or an object requested for a detailed description in an utterance unit in the above description, but may also designate a character string. In this case, the request information transmission unit 253 of the terminal 20-3 further sets designated character string information indicating a designated character string in the re-utterance request notification information or the detailed description request notification information. When a result of a morpheme analysis is added to utterance content text, the designated character string information may be selected on a word basis. The notification distribution unit 353 of the conference support apparatus 30 further sets designated character string information acquired from the re-utterance request notification information in re-utterance request distribution information, and further sets designated character string information acquired from the detailed description request notification information in detailed description request distribution information. The display control unit 251 of the terminal 20 reads an utterance identifier and the designated character string information from the received re-utterance request distribution information or detailed description request distribution information. The display control unit 251 performs a display such as changing a character color of a character string which is included in text of utterance information determined by the read utterance identifier and coincides with the designated character string information, changing a background color, or flickering a character. In addition, the designated character string information may also be included in text set in the detailed description request distribution information. For example, a notification text "Mr. B, please speak about ZZZ in detail" may be generated by further inserting a phrase using designated character string information "ZZZ" in the above example.

The request information transmission unit 253 of the terminal 20 generates requesting user display information and a notification text to be set in speech rate reduction request distribution information, re-utterance request distribution information, or detailed description request distribution information, and may set them in the speech rate reduction request information, the re-utterance request notification information, or the detailed description request notification information.

In this case, the request information transmission unit 253 of the terminal 20 generates requesting user display information based on user display information of a user of a terminal set in advance. In addition, the request information transmission unit 253 of the terminal 20 acquires target speaker display information to be set in the notification text from user display information of a speaker corresponding to utterance content selected by a user.

In the above description, the conference support apparatus 30 transmits speech rate reduction request distribution information, re-utterance request distribution information, or detailed description request distribution information to the terminals 20 of all users participating in a conference, but may transmit the information only to some of the terminals 20, for example, to the terminal 20 of a user performing an utterance.

The notification distribution unit 353 of the conference support apparatus 30 outputs requesting user display information and notification text set in the speech rate reduction request distribution information, the re-utterance request distribution information, or the detailed description request distribution information to the minutes creating section 306. The minutes creating section 306 sets the requesting user display information and the notification text output from the notification distribution unit 353, like utterance information, in minutes information. The conference support apparatus 30 can cause the requesting user display information and the notification text set in the speech rate reduction request distribution information, the re-utterance request distribution information, or the detailed description request distribution information not to be included in the minutes information.

The processing unit 310 of the conference support apparatus 30 may have the same function as the display control unit 251, the operation determination unit 252, and the request information transmission unit 253 of the terminal 20. In this case, the processing unit 310 may display the same screen as a screen displayed on the display unit 203 by the display control unit 251 in the terminal 20 on a display unit 311, and receive the same operation as an operation performed by the operation unit 201 of the terminal 20 from the operation unit 309.

Second Embodiment

In the embodiment above, a microphone has been used as the input unit 11. In the present embodiment, the input unit 11 is a microphone or a keyboard (including touch panel type keyboard). When the input unit 11 is a microphone, the input unit 11 collects voice signals of a user, converts collected voice signals from analog signals to digital signals, and outputs the voice signals converted into digital signals to the conference support apparatus 30. The input unit 11 may output analog voice signals to the conference support apparatus 30. When the input unit 11 is a keyboard, the input unit 11 detects an operation of a user, and outputs text information on a result of the detection to the conference support apparatus 30. When the input unit 11 is a keyboard, the input unit 11 may be the operation unit 201 of the terminal 20. The input unit 11 may output voice signals or text information to the conference support apparatus 30 via wired cords or cables, or may transmit voice signals or text information to the conference support apparatus 30 wirelessly.

In this case, participants in a conference may arbitrarily select which of a microphone and a keyboard to use as the input unit 11. For example, when a participant is a hearing-impaired person, a keyboard is used as the input unit 11.

When text information has been received from the input unit 11, the acquisition unit 301 of the conference support apparatus 30 outputs the received text information to the text correction unit 305. In addition, the speech rate calculation unit 354 of the conference support apparatus 30 calculates the number of characters of text information input at a predetermined time as a speech rate.

According to the embodiments above, when voice recognition of utterance content in a conference takes time or when a speed at which text of a voice recognized utterance content is read does not catch up with a speed at which a display is updated, it is possible to ask a speaker to speak slowly. Therefore, it is possible to support an utterance conforming to a speed at which the utterance content of a conference is converted into text and a speed at which the utterance content converted into text is read. In addition, it is also possible to ask a speaker to repeat an utterance and to describe in detail the content of a previous utterance. As a result, it is also possible to urge consideration toward a conference in which hearing-impaired persons participate. Therefore, hearing-impaired persons also become easy to participate in a conference, and easy to give opinions with enhanced understanding of a conference.

All or some of the processings performed by the conference system 1 may be performed by recording a program for realizing all or some of the functions of the conference system 1 in the present invention in a computer-readable recording medium, and causing a computer system to read and execute the program recorded in this recording medium. The "computer system" herein includes hardware such as an OS and peripheral devices. In addition, the "computer system" also includes a WWW system having a homepage providing environment (or a display environment). Moreover, the "computer-readable recording medium" refers to a portable medium such as a flexible disc, a magneto-optical disc, a ROM, and a CD-ROM, or a storage device such as a hard disk embedded in a computer system. Furthermore, the "computer-readable recording medium" includes a medium holding a program for a certain period of time like a volatile memory (RAM) in a computer system serving as a server or a client when a program is transmitted via a network such as the Internet or a communication line such as a telephone line.

In addition, the program may be transmitted to another computer system from a computer system in which the program is stored in a storage device and the like via a transmission medium or by a transmission wave in a transmission medium. Here, the "transmission medium" which transmits a program refers to a medium having a function of transmitting information like a network (communication network) such as the Internet or a communication line (communication line) such as a telephone line. In addition, the program may be a program for realizing some of the functions above. Furthermore, the program may also be a so-called difference file (a difference program) which can realize the functions above in combination with a program which is already recorded in a computer system.

What is claimed is:

1. A conference system comprising:
   an utterance indication processing unit configured to order in time and sequentially display text information representing utterance content of each speaker on a display unit of each of one or more terminals;
   a notification unit configured to, when there is a touch input operation to select an utterance indication area of the text information displayed on the display unit of the one or more terminals, display text information requesting a speaker, who uttered the utterance content corresponding to the selected text information, to slow down a speech rate of the speaker on the display unit; and
   a target utterance input unit configured to input target utterance information indicating that the utterance content be requested for a re-utterance or a detailed description,
   wherein the notification unit displays text information requesting the speaker for the re-utterance or the detailed description and information indicating the utterance content indicated by the target utterance information on the display unit.

2. The conference system according to claim 1, further comprising:
   a target speaker input unit configured to input target speaker information indicating that the speaker be requested to slow down the speech rate,
   wherein the notification unit displays the text information requesting to slow down the speech rate and information of the speaker indicated by the target speaker information on the display unit.

3. The conference system according to claim 1, wherein the notification unit is constituted by a button or an icon image displayed on the display unit.

4. The conference system according to claim 1, further comprising:
   an input unit configured to input a voice signal of the speaker or text information representing utterance content of the speaker; and
   a speech rate calculation unit configured to calculate the speech rate on the basis of the voice signal or the text information input by the input unit,
   wherein the notification unit displays the text information requesting the speaker to slow down the speech rate on the basis of the speech rate calculated by the speech rate calculation unit on the display unit.

5. A method of controlling a conference system executed by the conference system, the method comprising:
   an utterance content display process of ordering in time and sequentially displaying text information representing utterance content of each speaker on a display unit of each of one or more terminals;
   a notification process of, when there is a touch input operation to select an utterance indication area of the text information displayed on the display unit of the one or more terminals, displaying text information requesting a speaker, who uttered the utterance content corresponding to the selected text information, to slow down a speech rate of the speaker on the display unit;

a target utterance input process of inputting target utterance information indicating that the utterance content be requested for a re-utterance or a detailed description; and a display process of displaying text information requesting the speaker for the re-utterance or the detailed description and information indicating the utterance content indicated by the target utterance information on the display unit.

6. A computer readable non-transitory storage medium storing a program which causes a computer of a conference support apparatus to execute processes, the processes comprising:

an utterance content display process of ordering in time and sequentially displaying text information representing utterance content of each speaker on a display unit of each of one or more terminals connected to the conference support apparatus;

a notification process of, when there is a touch input operation to select an utterance indication area of the text information displayed on the display unit of the one or more terminals, displaying text information requesting a speaker, who uttered the utterance content corresponding to the selected text information, to slow down a speech rate of the speaker on the display unit;

a target utterance input process of inputting target utterance information indicating that the utterance content be requested for a re-utterance or a detailed description; and a display process of displaying text information requesting the speaker for the re-utterance or the detailed description and information indicating the utterance content indicated by the target utterance information on the display unit.

7. A computer readable non-transitory storage medium storing a program which causes a computer of a terminal connected to a conference support apparatus to execute processes, the processes comprising:

an utterance content display process of receiving text information representing utterance content of each speaker from the conference support apparatus and ordering in time and sequentially displaying the received text information on a display unit;

a notification display process of, when there is a touch input operation to select an utterance indication area of the text information in another terminal which orders in time and sequentially displays the text information on a display unit of the another terminal, receiving text information requesting to slow down a speech rate of the speaker, who uttered the utterance content corresponding to the selected text information, from the conference support apparatus and displaying the received text information on the display unit;

an information display process of, when target utterance information indicating that the utterance content be requested for a re-utterance or a detailed description is inputted in the another terminal, receiving utterance related request distribution information including text information requesting the speaker for the re-utterance or the detailed description and information indicating the utterance content indicated by the target utterance information from the conference support apparatus, and displaying the received utterance related request distribution information on the display unit.

* * * * *